United States Patent
Coelho et al.

(10) Patent No.: US 7,132,620 B2
(45) Date of Patent: Nov. 7, 2006

(54) INDUCTIVE THERMAL PLASMA TORCH

(75) Inventors: Daniel Coelho, Jouy-le-Mouttier (FR); Jean-Pascal Dumont-Monnet, Conflans (FR); Pierre Ripoche, Pithiviers (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/943,994

(22) Filed: Sep. 20, 2004

(65) Prior Publication Data
US 2005/0173384 A1 Aug. 11, 2005

(30) Foreign Application Priority Data
Sep. 19, 2003 (FR) .................................. 03 11011

(51) Int. Cl.
*B23K 10/00* (2006.01)
(52) U.S. Cl. ..................... 219/121.57; 219/121.48; 219/121.36; 315/111.51
(58) Field of Classification Search ........... 219/121.48, 219/121.54, 121.57, 121.36, 121.59; 315/111.51; 118/723 I
See application file for complete search history.

(56) References Cited

U.S. PATENT DOCUMENTS

| 3,340,415 A | 9/1967 | Ruiter et al. |
| 4,665,296 A | 5/1987 | Iwata et al. |
| 5,420,477 A | 5/1995 | Sims et al. |
| 5,444,208 A | 8/1995 | Mortensen |
| 6,215,092 B1 | 4/2001 | Goudeau et al. |
| 6,525,481 B1 | 2/2003 | Klima et al. |

FOREIGN PATENT DOCUMENTS

GB 976479 11/1964

*Primary Examiner*—Mark Paschall
(74) *Attorney, Agent, or Firm*—Sughrue Mion, PLLC

(57) ABSTRACT

The invention relates to an inductive thermal plasma torch comprising a confinement tube that comprises, longitudinally in relation to the tube, metal fingers which are insulated from each other, an ignition device that comprises an igniter (4) and an igniter support (1, 3), the purpose of the igniter (4) being to initiate a discharge in the plasma of the torch, the support having an electrically conductive end (1) which is connected to the electrical earth (2) of the plant and another, electrically insulating, end (3) which carries the igniter, the ignition device also comprising an electrically conductive connection (5) connecting the igniter (4) to the electrically conductive end (1) of the support so that the igniter is able to initiate the discharge in the plasma, the electrically conductive connection (5) having a section that is sufficiently narrow to limit the intensity of the current capable of passing through the igniter (4) in order to avoid electrical arcing by capacitive discharge between the ignition device and another part of the torch.

8 Claims, 1 Drawing Sheet

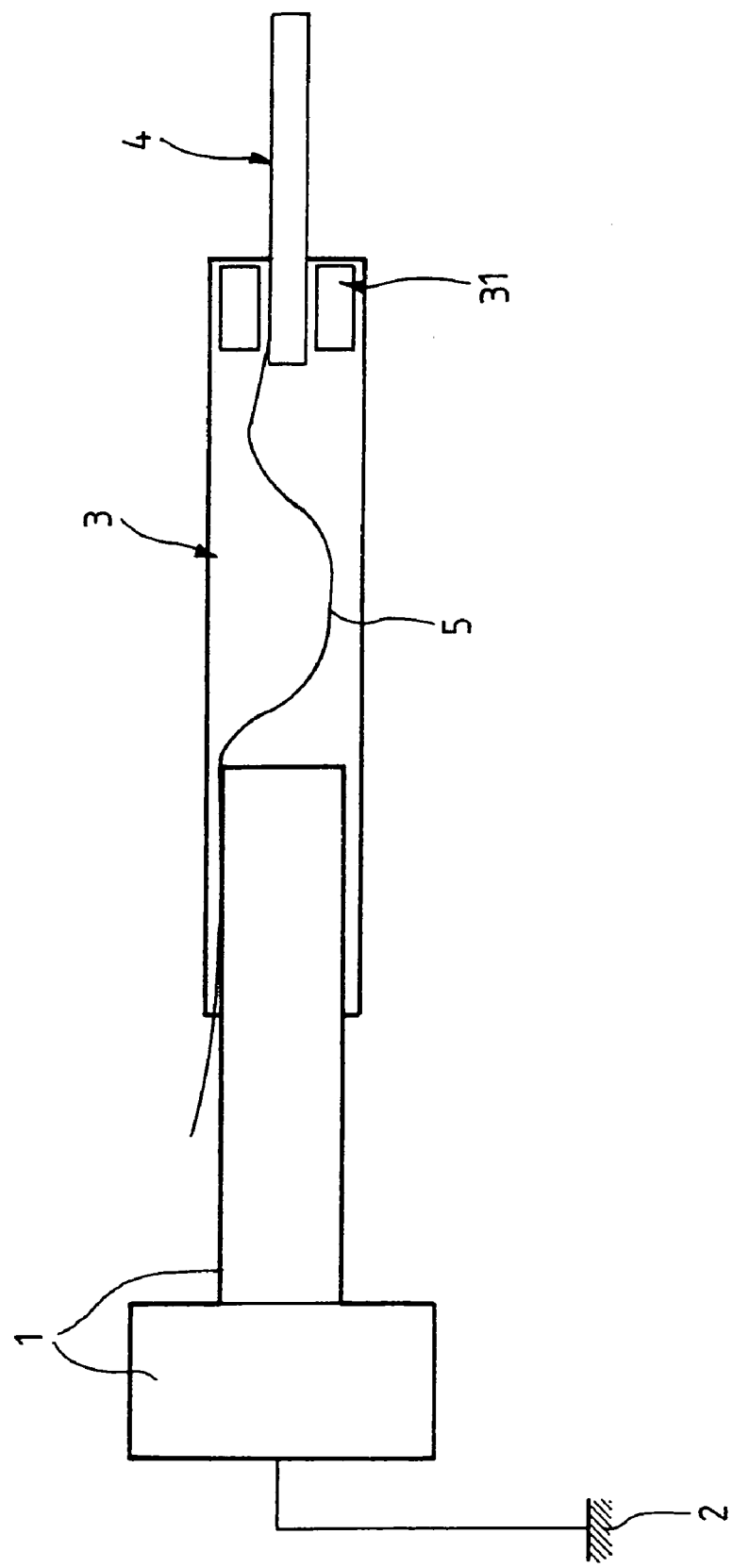
FIG_1

INDUCTIVE THERMAL PLASMA TORCH

BACKGROUND

1. Field of the Invention

The invention relates to the field of inductive thermal plasma torches and more precisely to the field of so-called "cold cage" torches.

2. Description of Related Art

An inductive thermal plasma torch uses a plasma gas, for example filtered or reconstituted air, which is injected at the base of the torch, it being possible for the reagents to be injected either at the base of the torch or at the tip of the torch. Compared with a conventional torch, having a water-cooled quartz chamber, the maximum output of which is approximately 150 kW, a cold-cage torch enables outputs of from 500 kW to 1 MW or thereabouts to be obtained. In addition, the life of a cold-cage torch is superior to that of a conventional quartz torch. The cold-cage torch has a confinement tube essentially composed of conductive confinement fingers that extend longitudinally in relation to the tube and are advantageously made of metal material, for example copper. The fingers are soldered at the base of the torch and are separated from one another by an insulating material, for example silica, in order to avoid the flow of induced currents in the confinement tube. The wall of the confinement tube is cooled, each finger preferably being cooled by an individual water circuit. The torch unit (torch base and confinement tube) is electrically insulated from the electrical ground of the whole plant that employs the torch, the said whole plant being, for example, a plasma recharge plant which uses silica particles of a primary preform to produce a fibre-optic final preform therefrom. When the torch is initiated, the plasma gas used is preferably not air, because the electric field required would be too great for direct initiation. Initiation is preferably carried out using an argon-type gas, which requires a smaller electric field and does not present a safety problem. However, the plasma obtained with argon is very short, because argon is a monoatomic gas. For that reason, once initiation is complete the argon is replaced, for example by air which, being an essentially diatomic gas, enables a longer and thus more effective plasma to be obtained for heating the preform, this longer plasma exhibiting an outer zone of appreciably higher energy than that of argon and allowing better thermal exchange with the preform.

The conventional ignition devices will not be suitable for cold-cage torches. Indeed conventional ignition devices will cause violent electrical arcs and destruction of certain parts or certain components of the cold-cage torch, or will be totally ineffective.

In a cold-cage torch, as in a conventional quartz torch, the electromagnetic field does not allow spontaneous ionisation of the plasma gas, which is why thermal or electrical initiation is necessary. A number of prior art ignition devices that enable initiation of a conventional quartz torch will be considered below.

According to a first prior art, the ignition device enabling initiation to be carried out is a Tesla coil. Coronas are created inside the torch and are converted to thermal plasma. However the Tesla coil creates an electric field that can pass through only a single thickness of an electrically transparent wall, such as, for example, the quartz wall of a conventional quartz torch. This ignition device has the drawback of being limited to conventional quartz torches, made of quartz and having a single thickness, that is to say, low-output torches.

According to a second prior art, the ignition is carried out by the generation of an electric arc, enabling the generation of coronas which will be converted to thermal plasma. Two ignition devices allow that outcome. The first ignition device is formed by two graphite electrodes connected to a power supply. Given that the use of graphite electrodes is complex and difficult, this first ignition device is complex and difficult and therefore cannot readily be used industrially. The second ignition device is formed by a coil of which the ends are opposite to each other and form a point discharge. A difference in potential is hence created between, on the one hand, one of the electrodes which is located at the end of the coil and, on the other hand, the other electrode which is linear and which passes through the interior of the coil. This second ignition device is either able to effect initiation of the plasma provided that a very high power is applied which, when the ends are well-shaped in the form of a point, may destroy the torch by the violence of the ignition or, when the ends are blunted and have become rounded, it may no longer function correctly and no longer cause initiation at all, which rapidly and inevitably occurs after several ignition attempts. This second device is consequently not very practical, especially for industrial applications.

According to a third prior art, the initiation is effected using cold plasma at low pressure. At low pressure, argon plasma is initiated spontaneously under the effect of a high-voltage and high-frequency electric field. Then, the vacuum is broken, and the temperature, the pressure and the power increase so as to be returned to the usual conditions of thermal plasma. This type of ignition device, however, requires a narrow chamber in which, for example, the movements of the primary preform which is being recharged may be so effected that the chemical reaction takes place in a controlled atmosphere. This third prior art, which proposes an actual "reactor", is far too complex; it is unusable and oversized in relation to the need of the application, which is concerned merely with a "single flame" in the surrounding atmosphere.

According to a fourth prior art, the ignition device is formed by a refractory rod, for example made of graphite or molybdenum, inserted into the torch, which is then heated by induction so as to emit "thermal" electrons which will ionise the argon and thus initiate the discharge. For a conventional quartz torch, if the arm supporting the rod is electrically conductive, for example metallic, hence if the rod is connected to the electrical earth of the plant as a whole, initiation is effected under good conditions; conversely, if the arm supporting the rod is insulating, hence if the rod is of floating potential, insulated from the remainder of the plant, the initiation is achieved less effectively.

If it is desired, for a cold-cage torch, to use an ignition device according to the fourth prior art, the following two problems arise: either the arm supporting the rod is conductive, for example metallic, in which case the rod is connected to the electrical ground of the whole, and the initiation is effected but an electric arc is produced which damages the torch; or the arm supporting the rod is insulating, in which case the rod is insulated from the rest of the plant and then there is no initiation at all. On the one hand the essentially metal confinement tube appears to block the electric field of the inductor. On the other hand, the insulation between the fingers constituting the confinement tube prevents the flow of induced electric currents. Too little output, whether in the form of induced electric field or in the form of flow of induced currents, is therefore available in the torch and initiation is not successful.

There is known according to FIG. 3 of the American patent U.S. Pat. No. 5,017,751 a graphite rod 52 which is connected to the electrical ground (see lines 4–9, column 6), but that rod does not form part of the ignition device; it bas a totally different function which is that, during transition from the argon plasma to the nitrogen plasma, it enables degradation of the form of the plasma to be avoided (see lines 46–54, column 5 and lines 18–20, column 60).

There is known according to FIG. 1 of American patent U.S. Pat. No. 4,665,296 a rod Lb which is connected to the electrical ground, but no detail is given about the nature of the electric connection Lc connecting it to the electrical ground.

SUMMARY OF THE INVENTION

The solution advocated by the invention concerns an improvement in the ignition device according to the fourth prior art. In order to avoid the problems of arcing, the igniter is carried by its support at one end thereof, that end being insulated from the electrical ground. In order nevertheless to allow initiation, a calibrated electrically conductive connection connects the igniter to the electrical ground. This electrically conductive connection is calibrated in such a manner as to be both sufficiently electrically insulating to avoid the creation of electric arcs that may damage the torch and sufficiently electrically conductive to initiate the discharge in the plasma. For that purpose, in terms of electrical conductivity the connection is so chosen as to initiate the plasma effectively, but has a section that is sufficiently narrow to avoid the risks of electrical arcing that may damage the torch. The narrow section of the electrically conductive connection will avoid the risk of electric arcing by capacitive discharge leading to very high electrical currents passing between the ignition device and another part of the torch. The electrically conductive connection thus presents a median region of resistivity that allows an electrical current to pass through that is both sufficient to ignite the plasma effectively and restricted enough to avoid electrical arcing that may damage the torch.

In addition to effective initiation of the plasma without any electrical arcing that may damage the torch, advantages of the cold-cage torch ignition device according to the invention are the virtually negligible additional cast and easy industrial application.

There is provided in accordance with the invention an inductive thermal plasma torch for use in a plant and comprising a confinement tube which comprises, longitudinally in relation to the tube, metal fingers insulated from each other, an ignition device which comprises an igniter and an igniter support, the purpose of the igniter being to initiate a discharge in the plasma of the torch, the support having an electrically conductive end which is to be connected to the electric earth of the plant, characterised in that the support has another, electrically insulating, end which carries the igniter, and in that the ignition device also comprises an electrically conductive connection connecting the igniter to the electrically conductive end of the support so that the igniter is able to initiate the discharge in the plasma, the said electrically conductive connection having a section that is sufficiently narrow to limit the intensity of the current capable of passing through the igniter in order to avoid electrical arcing by capacitive discharge between the ignition device and another part of the torch.

BRIEF DESCRIPTION OF THE DRAWINGS

The invention will be better understood and other features and advantages will be apparent from the description hereinbelow and from the accompanying drawings, provided by way of example, in which:

FIG. 1 is a diagrammatic representation of a side view in section of an ignition device for a cold-cage torch according to the invention.

DETAILED DESCRIPTION OF THE INVENTION

FIG. 1 is a diagramatic representation of a view in section of an ignition device for a cold-cage torch according to the invention. The ignition device comprises a support comprising on the one hand an electrically conductive end 1, which is connected to ground 2 of the plant, and on the other hand an electrically insulating end 3, which carries an igniter 4 for initiating the plasma in the torch. The igniter 4 is supported by the electrically insulating end 3. A calibrated electrically conductive connection 5 connects the igniter 4 to the electrically conductive end 1 of the support.

In one detailed embodiment, provided merely by way of example, the igniter 4 is held on the electrically insulating end 3 of the support by way of a high-temperature mesh tape 31. The electrically conductive end 1 is made of stainless steel (inox). The electrically insulating end 3 is a quartz tube. The igniter is made of graphite. The calibrated electrically conductive connection 5 is a copper wire having a diameter of about 0.2 mm.

Preferably, the electrically conductive connection 5 is likewise calibrated so as to act as a fuse wire in the event of electrical arcing by capacitive discharge between the ignition device and another part of the torch. This is for the purpose of avoiding any significant damage to the torch should an electric arc be produced.

Preferably, the electrically insulating end 3 of the support comprises a quartz tube.

Preferably, the electrically conductive connection is a metal wire. The metal wire preferably has a diameter of a few tenths of a millimeter, typically less than 0.5 mm, and advantageously has a diameter of from 0.1 mm to 0.3 mm. The metal wire is preferably made of copper.

The invention claimed is:

1. An ignition device for an inductive thermal plasma torch, comprising:
   an inductive igniter (4) and an igniter support (1, 3), the igniter (4) initiating a plasma discharge in the torch, and the support having an electrically conductive end (1) which is to be connected to an electrical ground (2) and an electrically insulating end (3) which carries the igniter,
   wherein the ignition device also comprises an electrically conductive connection (5) connecting the igniter (4) to the electrically conductive end (1) of the support so that the igniter is able to initiate the discharge in the plasma, said electrically conductive connection (5) having a section that is sufficiently narrow to limit the intensity of the current capable of passing through the igniter (4) in order to avoid electrical arcing by capacitive discharge between the ignition device and another part of the inductive thermal plasma torch.

2. The ignition device according to claim 1, wherein the electrically conductive connection (5) is so calibrated as to act as a fuse wire in the event of electrical arcing by capacitive discharge between the ignition device and another part of the torch.

3. The ignition device according to claim 1, wherein the electrically insulating end (3) of the support comprises a quartz tube.

4. The ignition device according to claim 1, wherein the electrically conductive connection (5) is a metal wire.

5. The ignition device according to claim 4, wherein the metal wire (5) has a diameter of a few tenths of a millimeter.

6. The ignition device according to claim 4, wherein the metal wire (5) has a diameter from 0.1 mm to 0.3 mm.

7. The ignition device according to claim 4, wherein the metal wire (5) is made of copper.

8. A plant for the manufacture of fibre-optic final perform by plasma recharge, using particles, of a primary perform, wherein the plant comprises an inductive thermal plasma torch comprising an ignition device according to claim 1.

* * * * *